US007929149B2

(12) United States Patent
Heiden

(10) Patent No.: US 7,929,149 B2
(45) Date of Patent: Apr. 19, 2011

(54) COORDINATE MEASURING MACHINE AND A METHOD FOR CORRECTING NON-LINEARITIES OF THE INTERFEROMETERS OF A COORDINATE MEASURING MACHINE

(75) Inventor: Michael Heiden, Woelfersheim (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 350 days.

(21) Appl. No.: 12/176,049

(22) Filed: Jul. 18, 2008

(65) Prior Publication Data

US 2009/0040530 A1    Feb. 12, 2009

(30) Foreign Application Priority Data

Aug. 6, 2007    (DE) .................... 10 2007 036 850

(51) Int. Cl.
*G01B 11/02*    (2006.01)
(52) U.S. Cl. ....................................... 356/500
(58) Field of Classification Search .................. 356/496, 356/498, 500
See application file for complete search history.

(56) References Cited

U.S. PATENT DOCUMENTS

| 6,008,902 | A | 12/1999 | Rinn |
| 6,137,574 | A | 10/2000 | Hill |
| 6,738,143 | B2 | 5/2004 | Chu |
| 6,891,624 | B2* | 5/2005 | Hill ............................. 356/500 |
| 7,336,369 | B2* | 2/2008 | Eckes et al. ................... 356/500 |
| 7,548,321 | B2* | 6/2009 | Rinn ............................ 356/500 |
| 2002/0186376 | A1 | 12/2002 | Brown |
| 2007/0103667 | A1 | 5/2007 | Ferber et al. |
| 2007/0268495 | A1 | 11/2007 | Rinn |
| 2007/0268496 | A1 | 11/2007 | Boesser et al. |

OTHER PUBLICATIONS

Bobroff, N., "Residual errors in laser interferometry from air turbulence and nonlinearity," Applied Optics, vol. 26, No. 13, Jul. 1, 1987, pp. 2676-2682.

* cited by examiner

*Primary Examiner* — Michael A Lyons
(74) *Attorney, Agent, or Firm* — Houston Eliseeva, LLP

(57) ABSTRACT

A method and a coordinate measuring machine (1) are provided, wherein the non-linearities of an interferometer (24) can be corrected. A measuring stage (20) traversable in a plane (25*a*) is provided for measurement. The substrate (2) is placed in a measuring stage (20); wherein the position of the measuring stage (20) along each of the motion axes is determined by at least one interferometer (24) in each case. A computer (16) is provided for compensating the non-linearity inherent in each of the interferometers (24), wherein the position of the measuring stage (20) to be determined by the interferometers (24) is arranged along a trajectory (52, 60, 67) of the measuring stage (20), which is composed at least partially of components of the axes.

11 Claims, 4 Drawing Sheets

COORDINATE MEASURING MACHINE AND A METHOD FOR CORRECTING NON-LINEARITIES OF THE INTERFEROMETERS OF A COORDINATE MEASURING MACHINE

RELATED APPLICATIONS

This application claims priority to German Patent Application No. DE 10 2007 036 850. 1, filed on Aug. 6, 2007, which is incorporated herein by reference in its entirety.

FIELD OF THE INVENTION

The present invention relates to a coordinate measuring machine.

Further the invention relates to a method for correcting the non-linearities of the interferometers of a coordinate measuring machine. Herein, a measuring stage traversable in one plane is provided, wherein the plane is defined by an axis in the X coordinate direction and an axis in the Y coordinate direction. A measuring lens is provided for determination of the position of structures on the substrate. The measuring lens is arranged in the optical axis. The substrate is placed in a measuring stage. A measuring position, at which at least one structure to be measured is provided, is traversable to the optical axis by means of the measuring stage.

BACKGROUND OF THE INVENTION

The interferometers for determining the position of the measuring stage are utilized for each of the axes. The sources of error inherent in the interferometer gain an increasing influence, as requirements become more stringent with respect to the precision of the measurement made by the interferometer of the measuring stage position in any one of the axes. When interferometric displacement measurements in the range of sub-nanometer accuracy are considered, it must be noted that these measurements are influenced by periodic deviations. The periodic length depends on the laser wavelength used and the structure of the interferometer. Typical periodic lengths are 158 nm and 316 nm. The amplitudes are typically in the range of less than 2 nm. In the case of measurements over larger distances these errors are usually negligible. Interferometer errors arise from errors in the optical alignment and from errors relating to the polarization of the components of the interferometer.

U.S. Pa. No. 6,738,143 discloses a system and a method for the compensation of non-linearites of an interferometer. Herein a plurality of digital positional values are recorded, which are divided into corresponding groups. A first group of digital positional values is processed digitally to generate a plurality of data values. The plurality of data values is then digitally processed to generate at least quasi static, non-linear parameters. A second group of digital positional values are compensated on the basis of the non-linear parameters determined by means of the first group of positional data. This method involves high computation overhead and is thus not conducive to the high throughput of a coordinate measuring machine.

Unpublished German Patent Application DE 102007018115 discloses a method for increasing measuring accuracy in the determination of coordinates of structures on a substrate. Herein the substrate is placed on a stage movable in the X and Y coordinate directions. First, a plurality of images of a structure on the substrate are recorded by means of a two-dimensional detector during the relative movement of a measuring lens in the Z coordinate direction and the simultaneous movement of the stage in the X and Y coordinate directions. The method proposed here requires high precision motor control and is thus difficult to implement. The difficulties encountered in implementation are due to both the mechanics and the feedback control required therefor.

German Patent Application DE 102007017630 A1 discloses a method for increasing measuring accuracy in the determination of coordinates of structures on a substrate. Herein a stage traversable in the X and Y coordinate directions is provided, which is placed in an interferometric optical measuring system. The structure on the substrate is imaged onto at least one detector by a measuring lens with an optical axis aligned in the Z coordinate direction. The structure is imaged with a so-called dual-scan, that is, the images of the structure are recorded once in the Z coordinate direction and once in the reverse Z coordinate direction. The image with the highest definition in each traversing direction is selected for evaluation of the position of the structure from the images recorded for each direction. Systematic errors can thus be eliminated with this procedure. In dual-scan, each position must be measured twice. As a consequence measuring time is increased and the throughput of the coordinate measuring machine is reduced accordingly.

German Patent Specification DE 1963777 C1 discloses a method and an apparatus for error correction of an interferometer. Herein a repeated calibration measurement for a constant calibration distance divided up into two distance segments is carried out, wherein the one distance segment is measured using an interferometer and the other segment is measured with an additional distance measuring system that does not present an error which is periodic with respect to the distance measured. Prior to each calibration measurement the distance segment measured by the interferometer is modified marginally. The second distance segment is modified accordingly in the opposite direction. The sum of the distance segment modifications of the partial segment must correspond to at least one optical path length modification of the interferometer by the measuring wave length. Using the various calibration measuring results for the constant calibration distance the periodic error components are separated and a wavelength dependent error curve is determined in order to correct any subsequent interferometer measurements. The teachings disclosed within the scope of this protection right are not suitable for maintaining high throughput of the coordinate measuring machine.

U.S. Pat. No. 6,137,574 discloses a system and a method for characterizing and correcting cyclical errors in the distance measurement of interferometers. The document refers to additional aids which can be placed in the beam path of the interferometer to correct the errors attributable to the interferometer.

The article by Norman Bobrov: "Residual errors in laser interferometry from air turbulence and non-linearity" in: Applied Optics, Vol. 26, No. 13, pp. 2676 to 2682, 1987 also discloses the problem of interferometers used for position determination exhibiting a cyclical error. The inventive method or inventive apparatus is not disclosed with which the errors of the interferometers used to determine the position of a measuring stage can be corrected.

German Patent Application DE 102005052758 discloses a substrate holder apparatus for application in a position measuring device (coordinate measuring machine). This document also addresses the problem of interferometer error in the determination of the position of the measuring stage in the coordinate measuring machine. The method disclosed in the invention is not dealt with here.

U.S. Patent Application 2002/0186376 A1 discloses an etalon for adjusting the effective length of the etalon.

SUMMARY OF THE INVENTION

It is therefore an object of the present invention to provide a coordinate measuring machine and a method for correcting the non-linearities of the interferometers in 2D mask metrology. Particular attention must be paid that the correction does not negatively affect the throughput of a coordinate measuring machine.

The object is achieved by a coordinate measuring machine comprising: a measuring stage traversable in a plane, wherein the plane is defined by an axis in a X coordinate direction and an axis in a Y coordinate direction; a measuring lens arranged in an optical axis for determining the position of structures on a substrate; a measuring stage to place the substrate on, wherein a measuring position at which at least one structure to be measured is moved by the measuring stage to the optical axis; at least one interferometer is provided for determining the position of the measuring stage along each of the axes; a computer connected to each interferometer for determination of the position of the measuring stage, wherein the computer corrects the non-linearity inherent in each interferometer and the interferometer determines the position of the measuring stage along a trajectory of the measuring stage, wherein the trajectory on the one hand is directed toward a measuring position and on the other hand is directed away from a measuring position; the trajectory directed toward a measuring position at least partially comprises a component of the X coordinate direction and a component of the Y coordinate direction and in that on the trajectory directed in both directions, correction values are obtained which are applicable to a position of a structure on the substrate measured at the measuring position.

Further, the above object is achieved by a method comprising the steps of:
 recording the data of the position of the measuring stage by means of interferometers, while moving toward a measuring position from one direction and/or moving away from the measuring position in another direction for determination of the position of the structure on the substrate, wherein one interferometer is associated with the movement of the measuring stage in each of the X coordinate direction and in the Y coordinate direction, respectively;
 moving the measuring stage along a trajectory toward the measuring position and away from the measuring position, which is composed at least partially of components in the X coordinate direction and in the Y coordinate direction;
 providing a computer for determining the non-linearity of the interferometers from at least a part of the data of the position of the measuring stage along the respective trajectory, and
 compensating the non-linearity of the interferometers at each measuring position by means of the computer.

It is particularly advantageous if the coordinate measuring machine has an associated computer for correcting the non-linearity inherent in each interferometer. The position of the measuring stage to be determined by the interferometer is arranged along a movement trajectory of the measuring stage. The trajectory is directed toward a position on the structure to be measured or away from the position of a structure to be measured. The trajectory is at least partially comprised of components of the axes, wherein correction values are determined on the trajectory directed toward and/or away from a measuring point, which can be used for the measured position of a structure on the substrate.

One of the two axes arranged at right angles to one another is in the X coordinate direction and the other one of the two axes arranged at right angles to one another is in the Y coordinate direction.

Additional interferometers can also be provided for measurement of the angular position of the measuring stage. Likewise, an interferometer for measuring the reference wavelength can be provided. The interferometers serve to measure the position of the measuring stage, to measure the angle of the position of the measuring stage or the angular position of the lens, or to measure the reference wavelength. These measurements can also be corrected by the computer.

An etalon with a length which can be varied is provided to determine the correction values for the non-linearity correction. A piezoelectric drive for adjusting the length of the etalon is provided for this purpose.

The inventive method is advantageous in that for determination of the position of the structure on a substrate, data relating to the position of the measuring stage is recorded by interferometers during the movement toward a measuring position and/or the movement away from a measuring position. An interferometer is associated with each motion axis of the measuring stage. The measuring stage is traversed along a trajectory comprised at least partially of components of the axes defining the plane in which the measuring stage is moved. A computer is provided for determining the non-linearity of the interferometer from the data of the position of the measuring stage obtained along the respective trajectory. The computer compensates the non-linearity of the interferometer at each measuring position.

The two axes arranged perpendicular to one another are aligned in the X coordinate direction and Y coordinate direction.

The measuring stage is moved obliquely toward and/or away from one measuring position to the next measuring position, in order to record correction data simultaneously in both the X coordinate direction and the Y coordinate direction. The correction data obtained once both during the movement toward and during the movement away from the measuring position is used for a plurality of measuring positions present on the substrate.

It is also possible, that the measuring position is only reached in one axis direction, to obtain correction data in this direction. The correction data for the other direction is taken from the data collected during the previous traversal in this direction. The axis direction is either the X coordinate direction or the Y coordinate direction.

The measuring stage can be moved toward the measuring position at varying velocities. Thus the next measuring position is, for example, first approached at high velocity and over the final distance before the measuring position is reached the velocity is reduced to such an extent as to enable data for the non-linearity correction to be recorded.

An etalon is provided, the length of which can be varied, to obtain correction values for the non-linearity correction. The length of the etalon is changed with the aid of a piezoelectric drive.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
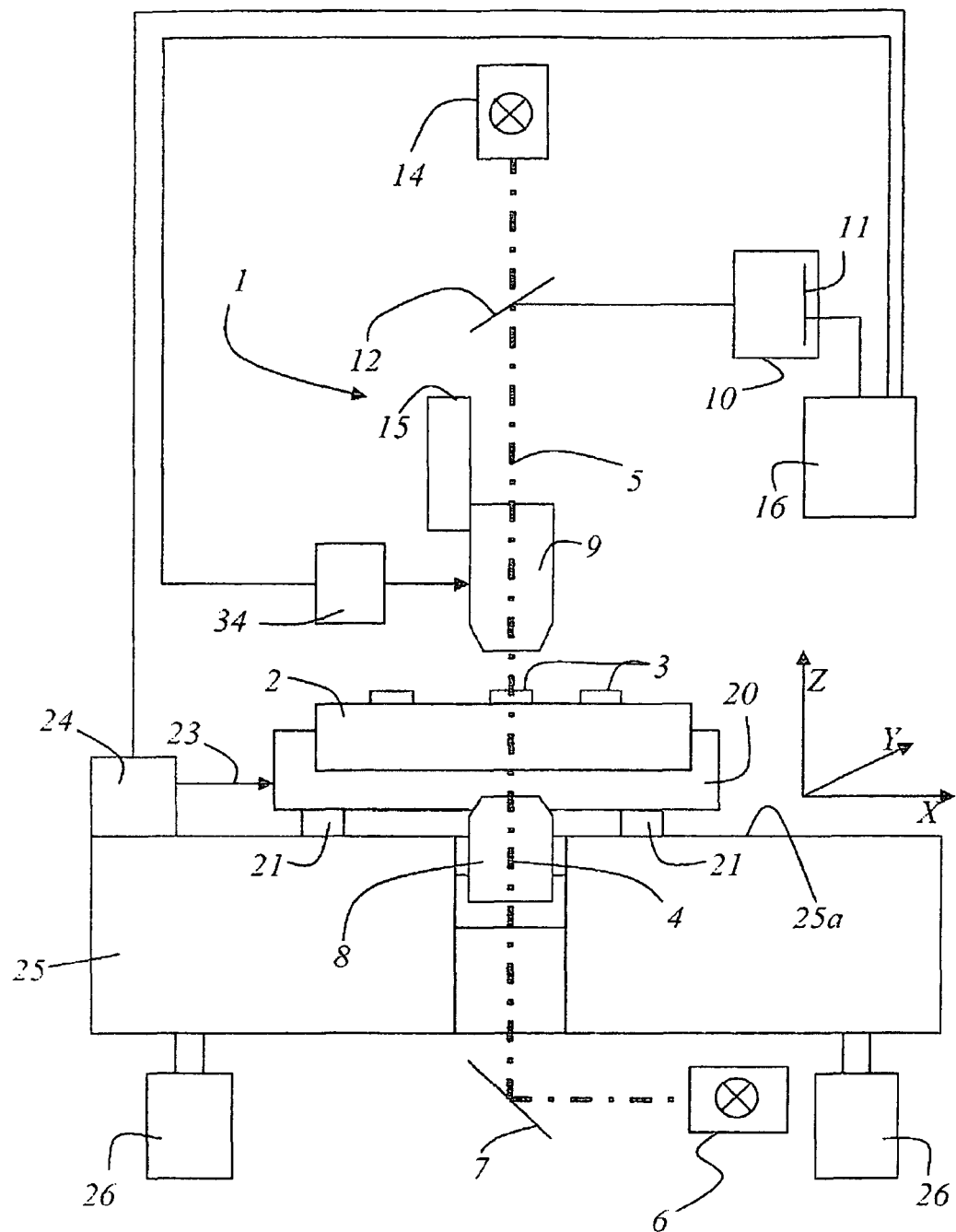
FIG. 1 schematically shows a coordinate measuring machine in which the method according to the present invention for position measurement can advantageously be carried out.

FIG. 1 schematically shows the structure of a coordinate measuring machine 1, in which the method according to the present invention can be carried out. The coordinate measuring machine 1 comprises a measuring stage 20, which is traversable in a plane 25a in two axes perpendicular to each other. Generally, the two axes perpendicular to each other are in the X coordinate direction and the Y coordinate direction. Plane 25a for traversal of the measuring stage is defined by a corresponding structural element 25. In the embodiment shown here, the structural element can be a granite block. It will be understood by a person skilled in the art, however, that the choice of material for forming structural element 25 is not to be regarded as restrictive to the invention. The measuring stage 20 traversable in plane 25a is supported on air bearings 21. The position of measuring stage 20 is measured by a laser interferometer 24 in each of the axes in which the measuring stage can traverse. For measurement, the laser interferometer 24 emits at least one light beam 23. In the schematic representation of the coordinate measuring machine 1 shown in FIG. 1, only one laser interferometer 24 is depicted for one axis. It is obvious to a person skilled in the art, however, how further interferometers should be arranged to enable corresponding measurement of the position of measuring stage 20 in other axes of movement of measuring stage 20.

Substrate 2, on which the structures 3 to be measured are arranged is placed in measuring stage 20. For the illumination of substrate 2, an incident-light illumination means 14 and a transmitted-light illumination means 6 are provided. The light from transmitted-light illumination means 6 is directed to substrate 2 via a redirecting mirror 7 and a condenser 8. The light emitted by transmitted-light illumination means 6 is propagated along transmitted-light illumination beam path 4. The light emitted by incident-light illumination means 14 is directed onto substrate 2 via measuring lens 9. Measuring lens 9 can be moved along the Z coordinate direction by means of a displacement means 15. It is thus possible, for example, to focus measuring lens 9 onto the respective structures 3 on substrate 2. The light emitted by substrate 2 is collected by measuring lens 9 and passed via a semitransparent mirror 12 to a camera 10. Camera 10 comprises a detector 11, which is connected to a computer 16 for converting the recorded signals into digital images. For vibration damping, the entire coordinate measuring machine 1 is supported on vibration-damped legs 26. Likewise, all interferometers 24, 34 comprised in coordinate measuring machine 1 are connected to computer 16. The position determined for structure 3 is a combination of the measurement of the position of measuring stage 20 and the measurement on detector 11 of the camera.

Figure 2:
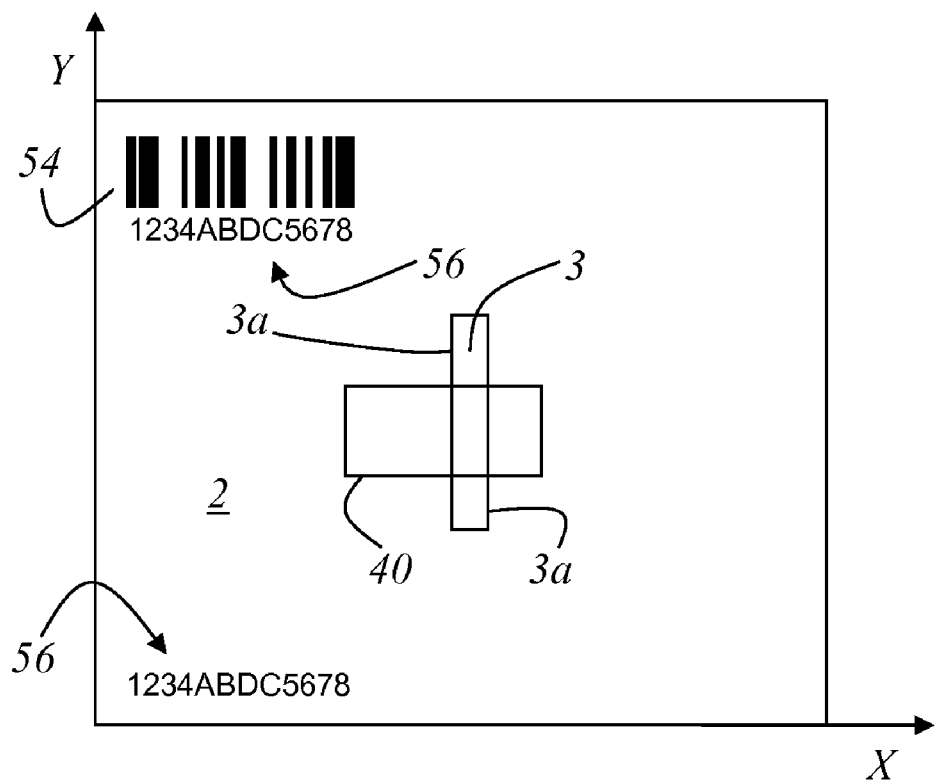
FIG. 2 shows a schematic representation of a substrate with structures arranged on it, the positions of which have to be measured relative to a coordinate system, such as the coordinate system of the mask.

FIG. 2 shows a schematic representation of a substrate 2 with structures 3 arranged on it. In addition to structures 3 the substrate can also comprise a plurality of identification means 54, 56. The identification means can be either a barcode 54 or an alphanumeric identification 56. The position of at least one edge 3a of structure 3 is determined, for example, using a measuring window 40. In the arrangement of measuring window 40 shown here, the two opposing edges 3a of structure 3 can both be determined. Measuring stage 20 is traversed such that structure 3 comes to lie within measuring window 40. If this is the case, coordinate measuring machine 1 has reached the measuring position. In the further description, reaching the measuring position should be understood as measuring window 40 being positioned relative to structure 3 in such a way, that position measurement of structure 3 can be carried out.

Figure 3:
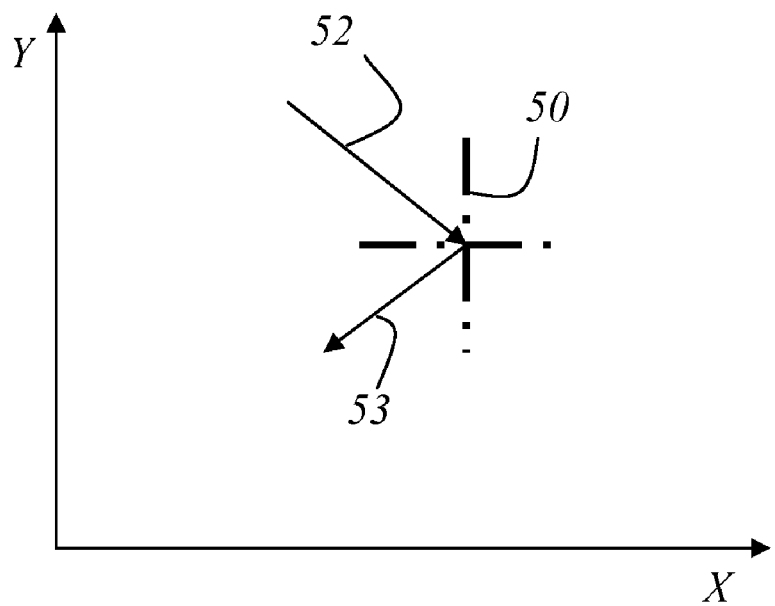
FIG. 3 shows an oblique movement toward the measuring position to enable correction values to be determined for both the X coordinate direction and Y coordinate direction simultaneously.

In coordinate measuring machine 1, measuring stage 20 can usually be traversed in two independent axes (directions). As mentioned above, the two independent axes are in the X coordinate direction and Y coordinate direction. Each of the axes is monitored by an interferometer. These interferometers all have slightly different tolerances and thus exhibit different non-linearities. Depending on the design of the interferometer the size and extent of the non-linearity is in the range of a few nanometers. This error is too large for 2D mask metrology and therefore requires correction. For measurement of the position of structure 3, as depicted in FIG. 2, measuring stage 20 stands still, thus correction of the non-linearity or recording of data for correction of the non-linearities of the interferometers can only be obtained while approaching measuring position 50 (see FIG. 3). Measuring position 50 is marked by a cross in FIG. 3. If, for example, measuring stage 20 only approaches measuring position 50 in one axis direction, such as the X coordinate direction, there would be no movement in the second axis (Y coordinate direction). In the axis in which no movement occurs, non-linearities cannot be corrected. Since the position of measuring stage 20 is monitored by two interferometers, measuring stage 20 must thus be traversed in both the X coordinate direction and the Y coordinate direction before measurement takes place. A trajectory 52 of this type, comprising components of both axes, i.e. components of the X coordinate direction and Y coordinate direction, is depicted in FIG. 3. Trajectory 52 thus depicts an oblique linear movement toward measuring position 50. Trajectory 53 is an oblique linear movement away from measuring position 50. Although the movement toward and away from the measuring position is depicted as linear in the illustration in FIG. 3, this should not be conceived as limiting to the invention. It will be understood by a person skilled in the art that any type of movement toward and/or away from a measuring position 50 is conceivable for recording correction data, providing the trajectories used comprise components of the X coordinate direction and Y coordinate direction.

Figure 4:
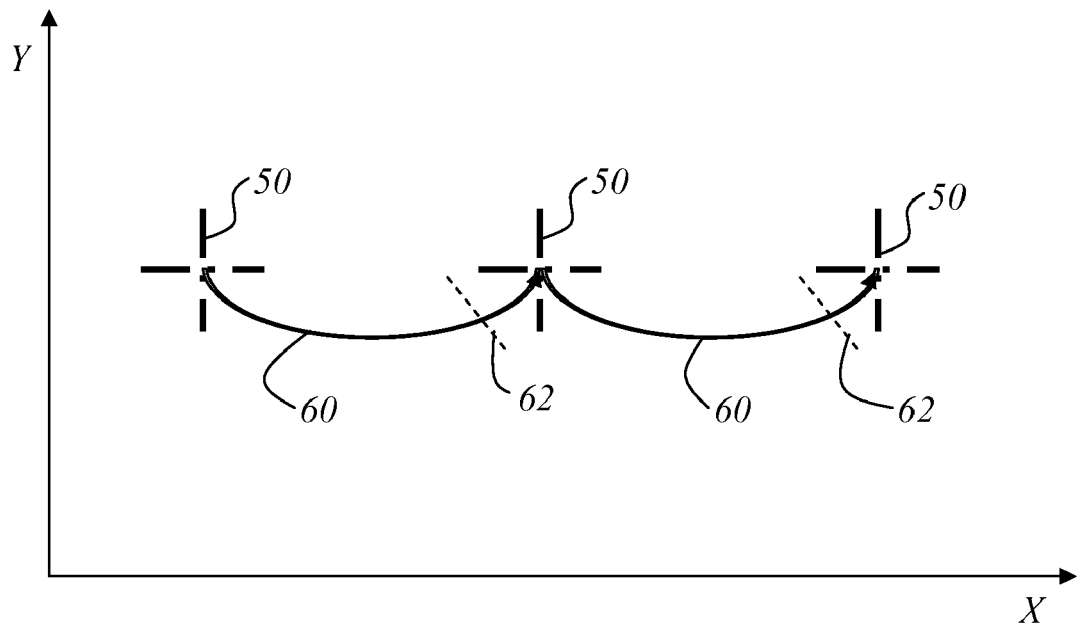
FIG. 4 shows an example of an oblique movement toward a measuring position, wherein the stage traverses along a line and wherein the data required for correction is recorded just before the measuring position is reached.

FIG. 4 describes a further embodiment for approaching measuring position 50. In the embodiment shown here, traversal between the individual measuring positions 50 of measuring stage 20 is carried out in a slight curve 60. It will be understood by a person skilled in the art that this curve 60 cannot be conceived as limiting to the invention. In the embodiment illustrated in FIG. 4, all measuring positions 50 within one line are traversed in a curve 60. With this embodiment of the method of measuring stage 20, up-to-date correction data can thus always be obtained for the respective measuring point or measuring position 50. To ensure computer 16 of coordinate measuring machine 1 is not overloaded, it is recommended that the measuring data required for correction of non-linearities is recorded as of line 62, depicted by a broken line in FIG. 4. Up to this line 62, measuring stage 20 can be traversed at higher velocity, since no data is recorded. This advantageously facilitates the increase of throughput.

Figure 5:
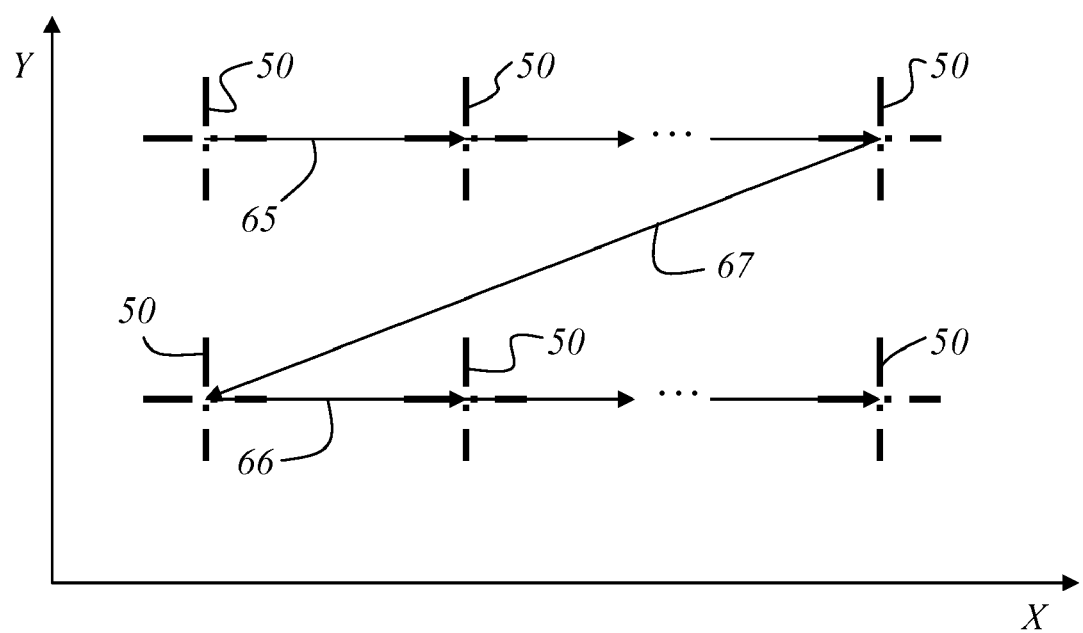
FIG. 5 shows the measuring stage traversing in a meandering fashion, wherein the measuring data is only recorded during the oblique traversal path from one line of measuring positions to a next line of measuring positions.

A further possibility of approaching measuring position 50 is depicted in FIG. 5. In this case, the individual measuring positions 50 are approached in a meandering fashion. The correction value for the fast axis direction (the X coordinate direction in the illustration in FIG. 5) is always obtained from the current movement. For correction of the slow axis, correction values are determined during movement in this direction and stored and are then used for correction of the entire subsequent movement in the fast axis. Measuring stage 20 is traversed in a meandering fashion. The correction data for the Y coordinate axis is only recorded during movement of the measuring stage between the first line 65 and the second line 66. The traversal path of the measuring stage 20 from the first line 65 to the second line 66 is indicated by reference numeral 67. Each of lines 65, 66, in which measuring positions 50 are located, must be corrected in the Y coordinate direction by the values acquired while traversing in the direction indicated by reference numeral 67. The current correction data for correcting the X coordinates is always available in line 65 or 66.

Figure 6:
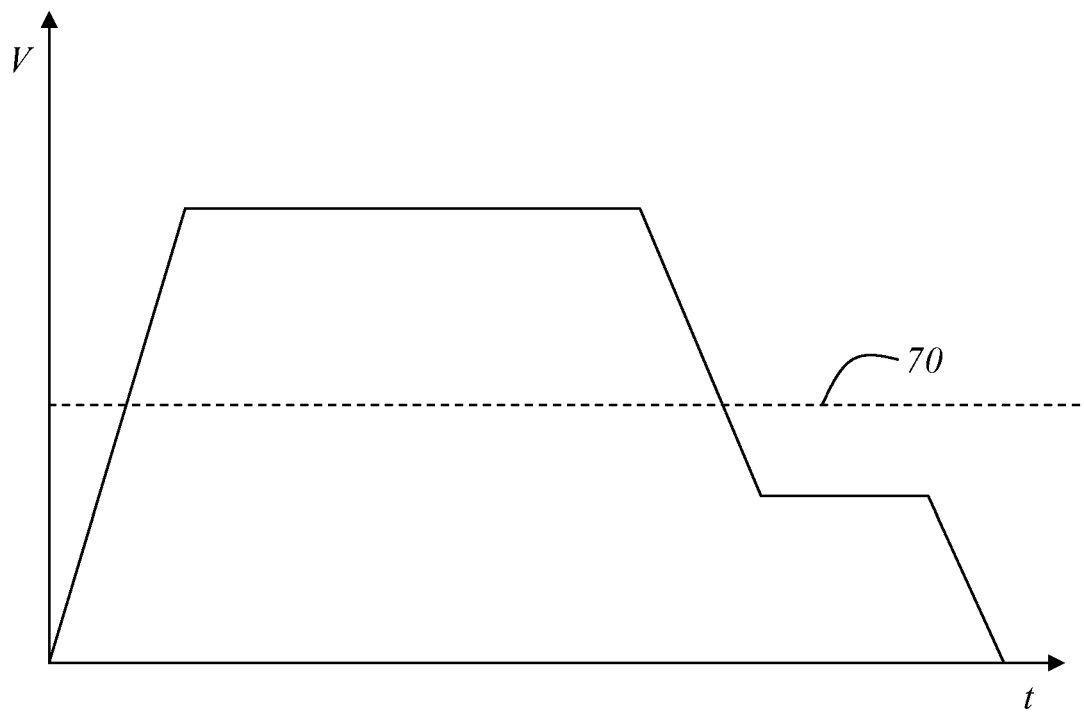
FIG. 6 shows the velocity of the measuring stage as a function of time, wherein the velocity of the measuring stage is reduced just before the measuring position is reached to enable measurement of the required correction values.

FIG. 6 shows the traversal velocity of the measuring stage as a function of time t. The velocity is reduced just before a measuring position is reached, to enable the correction parameters for correction of the non-linearities of the interferometer to be measured. In the illustration in FIG. 6, time t is the abscissa and the velocity of measuring stage 20 is the ordinate. The traversal velocity of measuring stage 20 must not be too high when data for the correction of non-linearities of the interferometer is recorded. The limit is depicted by broken line 70 in FIG. 6. If the traversal velocity of the measuring stage 20 is too high, the electronics would not be able to keep pace with evaluation. Determination of correction data for the non-linearities of the interferometers, on the other hand, only requires a small traversal distance of less or equal to 1 mm. It is therefore advantageous to first move measuring stage 20 toward measuring position 50 at high velocity to maintain a high throughput of masks in coordinate measuring machine 1. It is only just before measuring position 50 is reached that the velocity has to be reduced to a level suitable for recording correction data on the final section of the path approaching the measuring position.

Figure 7:
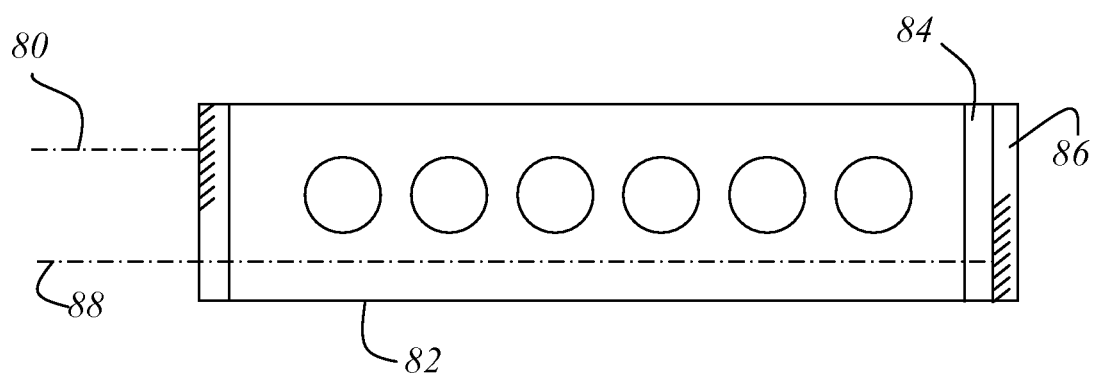
FIG. 7 shows an etalon comprising a piezoelectric drive, with the aid of which the length of the etalon can be varied.

FIG. 7 depicts a component of a novel interferometer. These novel interferometers can be utilized in 2D mask metrology for also measuring reference light beam 80. In angle measurement, as in the method described above, the tilt then has to be varied for determination of the correction parameters. Obtaining correction data for the measurement of the reference wavelength is not simple, as the length of an etalon 82 also has to be varied for this purpose. Etalon 82 is provided with a piezoelectric drive 84 which changes the length of etalon 82 during a calibration run. For this purpose, mirror 86 for measuring light beam 88 is traversed accordingly by piezoelectric drive 84. The correction data can be obtained as a result of the length of the etalon 82 changing during the calibration run.

While this invention has been particularly shown and described with references to preferred embodiments thereof, it will be understood by those skilled in the art that various changes in form and details may be made therein without departing from the scope of the invention encompassed by the appended claims.

What is claimed is:

1. A machine for determining position of structures on a substrate, comprising:
    a measuring stage traversable in a plane defined by an axis in a X coordinate direction and an axis in a Y coordinate direction;
    a measuring lens arranged in an optical axis for determining position of the structures on the substrate;
    a measuring stage, wherein a measuring position at which at least one structure to be measured is moved by the measuring stage relative to the optical axis and wherein the substrate is positioned on the measuring stage;
    interferometers determining position of the measuring stage along each of the axes; and
    a computer connected to each interferometer for determination of position of the measuring stage, wherein the computer corrects non-linearity of each interferometer by determining position of the measuring stage along a trajectory of the measuring stage using each interferometer,
    wherein a part of the trajectory is directed toward a measuring position and another part of the trajectory is directed away from the measuring position;
    wherein the trajectory approaching the measuring position at least partially comprises motion in the X direction and in the Y direction to obtain correction values applicable to the determining position of a structure on the substrate at the measuring position, and
    wherein the measuring position is initially approached along the trajectory at a high velocity and then, before the measuring position is reached, at a reduced velocity to record and process data to correct the interferometer non-linearity using the computer.

2. The machine according to claim 1, further comprising an interferometer determining an angular position of the measuring lens relative to the optical axis.

3. The machine according to claim 1, further comprising interferometers are used for measuring position of the measuring stage and/or for measuring angular position of the measuring stage and/or the measuring lens and/or for measuring a reference wavelength.

4. The machine according to claim 1, further comprising an etalon with a variable length to determine correction values for the non-linearity correction.

5. The machine according to claim 4, further comprising a piezoelectric drive changing the length of the etalon.

6. A method for correcting non-linearities of interferometers of a coordinate measuring machine comprising the interferometers, a measuring stage traversable in a plane defined by an axis in X coordinate direction and an axis in Y coordinate direction, and a measuring lens in an optical axis for determining position of structures on a substrate placed on the measuring stage, wherein a measuring position of at least one structure is positioned at the optical axis by the measuring stage; the method comprising the steps of:

recording position data for the measuring stage by the interferometers simultaneously moving the measuring stage toward the measuring position from one direction and/or moving the measuring stage away from the measuring position in another direction for determination of the position of the structure on the substrate, wherein one interferometer is associated with the movement of the measuring stage in each of the X coordinate direction and in the Y coordinate direction, respectively;

moving the measuring stage along a trajectory toward the measuring position and away from the measuring position, which is composed at least partially of movement in the X coordinate direction and in the Y coordinate direction;

using a computer to determine the non-linearity of the interferometers from at least a part of the position data for the measuring stage along the trajectory, and compensating the non-linearity of the interferometers at each measuring position by the computer, and wherein the measuring position is initially approached along the trajectory at a high velocity and then, before the measuring position is reached, at a reduced velocity to record and process data to correct the interferometer non-linearity using the computer.

7. The method according to claim 6, wherein the measuring stage is moved obliquely from one measuring position toward the next measuring position and the measuring stage is moved obliquely away from one measuring position to a next measuring position to collect correction data simultaneously in the X coordinate direction and Y coordinate direction.

8. The method according to claim 7, wherein the correction data is collected once during the movement toward the measuring position and/or during movement away from the measuring position, and the correction data is used for a plurality of measuring positions on the substrate.

9. The method according to claim 6, wherein the measuring position is only traversed in one axis direction, to obtain correction data in this direction only, wherein the correction data for the other direction is taken from data collected during the previous traversal in the other direction.

10. The method according to claim 6, further comprising obtaining correction values for the non-linearity correction using an etalon with a variable length.

11. The method according to claim 10, further comprising changing the length of the etalon with a piezoelectric drive.

* * * * *